United States Patent
Evans, V et al.

(10) Patent No.: US 9,560,252 B1
(45) Date of Patent: Jan. 31, 2017

(54) FLASH OPTIMIZATION FOR CAMERA DEVICES

(71) Applicant: Essential Products, Inc., Palo Alto, CA (US)

(72) Inventors: David John Evans, V, Palo Alto, CA (US); Xinrui Jiang, San Jose, CA (US); Andrew E. Rubin, Los Altos, CA (US); Matthew Hershenson, Los Altos, CA (US); Xiaoyu Miao, Palo Alto, CA (US); Joseph Anthony Tate, San Jose, CA (US); Jason Sean Gagne-Keats, Cupertino, CA (US)

(73) Assignee: Essential Products, Inc., Palo Alto, CA (US)

( * ) Notice: Subject to any disclaimer, the term of this patent is extended or adjusted under 35 U.S.C. 154(b) by 0 days.

(21) Appl. No.: 15/156,690

(22) Filed: May 17, 2016

Related U.S. Application Data

(60) Provisional application No. 62/300,631, filed on Feb. 26, 2016, provisional application No. 62/317,874, filed on Apr. 4, 2016.

(51) Int. Cl.
*H04N 5/225* (2006.01)

(52) U.S. Cl.
CPC ................. *H04N 5/2256* (2013.01)

(58) Field of Classification Search
CPC ............ H04N 5/2256; H04N 5/2354
See application file for complete search history.

(56) References Cited

U.S. PATENT DOCUMENTS

| | | | |
|---|---|---|---|
| 2007/0024742 A1* | 2/2007 | Raskar | H04N 5/2355 348/370 |
| 2015/0181139 A1* | 6/2015 | Kerbiriou | H04N 5/2256 348/297 |

* cited by examiner

*Primary Examiner* — Tuan Ho
(74) *Attorney, Agent, or Firm* — Perkins Coie LLP

(57) ABSTRACT

Various embodiments include a camera system. The camera system can receive a command to photograph an environment utilizing a camera. The camera system can identify a plurality of flash settings for a flash system of the camera. The camera system can drive the flash system in a sequence of flashes respectively corresponding to the plurality of flash settings. The camera system can then capture consecutive images utilizing the camera. The capturing of the consecutive images can be synchronized against the sequence of flashes such that a device can later combine the consecutive images to generate a composite image that represents a virtual photograph of the environment.

6 Claims, 6 Drawing Sheets

FLASH OPTIMIZATION FOR CAMERA DEVICES

CROSS-REFERENCE TO RELATED APPLICATION(S)

This application claims the benefit of U.S. Provisional Patent Application No. 62/300,631, entitled "MOBILE DEVICES AND MOBILE DEVICE ACCESSORIES," which was filed on Feb. 26, 2016, and U.S. Provisional Patent Application No. 62/317,874, entitled "FLASH OPTIMIZATION FOR CAMERA DEVICES," filed on Apr. 4, 2016, all of which are incorporated by reference herein in their entirety.

TECHNICAL FIELD

This disclosure relates generally to mobile device photography.

BACKGROUND

A "flash" is a device used in photography that produces a flash (e.g., typically for $\frac{1}{1000}$ to $\frac{1}{200}$ of a second) of artificial light at a color temperature of about 5500 Kelvin to help illuminate a scene. A major purpose of a flash is to illuminate a dark scene. Other uses include capturing quickly moving objects or changing the quality of light. A "flash" can refer either to a flash of light or the electronic flash unit discharging the flash of light. Most current flash units are electronic, having evolved from single use flashbulbs and flammable powders. Modern cameras can activate flash units automatically. However, the illumination of a flash unit is generally static, and does not provide consistent results across different photography context.

SUMMARY

Various embodiments include a mobile device with a camera configured to take consecutive images under different flash settings in response to a command to take a single photograph. A conventional flash is a unitary system, having a single lightbulb and a constant setting (e.g., a preset duration, a preset color temperature, a preset intensity, etc.). However, this unitary flash system cannot account for the variations of the dynamic environment that a camera is designed to capture. Accordingly, various embodiments advantageously enable a camera to adapt to the dynamic environment and without needing an operating user to configure its flash unit ahead of time.

In some embodiments, in response to a command to take a single photograph, a mobile device determines a plurality of flash settings. The mobile device can drive a flash system in a sequence of flashes in accordance with the plurality of flash settings while taking consecutive images synchronized to the sequence of flashes. In some embodiments, the plurality of flash settings are preset (e.g., unchanging from one photograph command to the next). In some embodiments, the plurality of flash settings are dynamically selected by detecting an illumination environment utilizing a camera and/or a light sensor of the mobile device.

The mobile device or a remote computer server networked with the mobile device can stack together the consecutive images to generate a composite image. The composite image can represent a virtual photograph of an environment. A "virtual photograph" is a synthetic image produced from a weighted blend of similar captured images under different lighting conditions. The consecutive images can be stacked together by adding the pixel values (e.g., in red green and blue (RGB) or cyan, magenta, yellow, and key (CMYK)) of the consecutive images in weighted proportions. For example, fractional values, representing the weighted proportions, can be assigned respectively to the consecutive images. The fractional values can add up to 1.

In some embodiments, the mobile device generates the composite image in response to capturing the consecutive images. For example, the composite image can be generated immediately after the consecutive images are stored in memory. In some embodiments, the mobile device or the remote computer server can generate the composite image in response to a user accessing the picture represented by the consecutive images for the first time. In some embodiments, the mobile device or the remote computer server can generate the composite image in response to a user command via a user interface. In some embodiments, the weighted proportions can be determined based on user interactions (e.g., user selected fractional values or user selected preview of the composite image generated based on device-specified weighted proportions of the consecutive images).

Some embodiments of this disclosure have other aspects, elements, features, and steps in addition to or in place of what is described above. These potential additions and replacements are described throughout the rest of the specification

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

Figure 1:
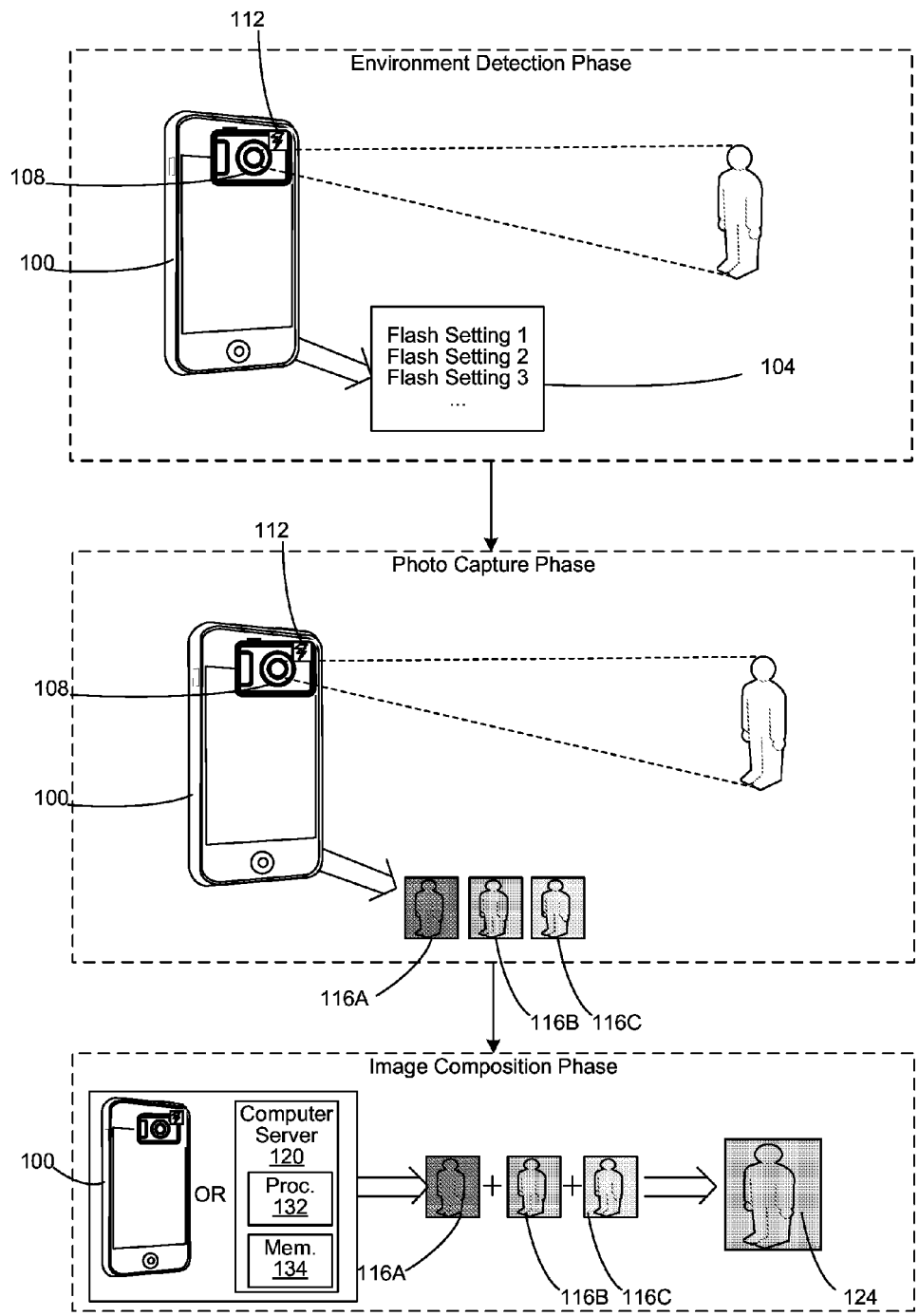
FIG. 1 is a data flow diagram illustrating a process to generate a composite image from consecutive image captured under different flash settings, in accordance with various embodiments.

FIG. 1 is a data flow diagram illustrating a process to generate a composite image from consecutive image captured under different flash settings, in accordance with various embodiments. For example, the process can involve a mobile device 100.

In some embodiments, the process includes an optional environment detection phase, the mobile device 100 can identify a plurality of different flash settings (e.g., a flash setting 104A, a flash setting 104B, and a flash setting 104C, collectively as the "flash settings 104") by detecting an illumination environment that a camera 108 of the mobile device 100 is facing. The environmental detection phase can be in response to a command to take a photograph. In other embodiments, the plurality of flash settings are static (e.g., hardcoded) and can be identified in the memory of the mobile device 100.

In a photo capture phase, the mobile device 100 can drive its flash system 112 in a sequence of flashes in accordance with the plurality of different flash settings. The photo capture phase can immediately following the environment detection phase such that the operating user of the mobile device 100 does not have an opportunity to move the camera 108 to substantially affect the accuracy of the detected illumination environment. The mobile device 100 can capture, utilizing the camera 108, consecutive images (e.g., a first image 116A, a second image 116B, and a third image 116C, collectively as the "consecutive images 116") synchronized with the sequence of flashes. The consecutive images 116 can be stored in a memory of the mobile device 100.

In an image composition phase, the mobile device 100 or a remote computer server 120 can blend the consecutive images 116 into a composite image 124. The remote computer server 120 can include a processor 132 configured by executable instructions stored on a computer readable medium 134. For example, the remote computer server 120 can receive the consecutive images 116 from the mobile device 100.

The mobile device 100 or the remote computer server 120 can generate the composite image 124 as a weighted combination of at least a subset of the consecutive images 116 (e.g., referred to as "component images"). In some embodiments, the component images are all of the consecutive images 116. In some embodiments, the mobile device 100 can select the component images from the consecutive images 116 by detecting the picture quality (e.g., degree of focus, degree of blur, degree of overexposure, degree of underexposure, white balancing, degree of lens flare, degree of contrast, or any combination thereof) of the consecutive images 116. For example, the mobile device 100 and/or the remote computer server 120 can filter out any image below a picture quality threshold. The component images can be at least a subset of the consecutive images 116 with the measurements of the picture quality above preset thresholds.

In some embodiments, the mobile device 100 or the remote computer server 120 can determine the weights of the component images based on a composition optimization algorithm. The mobile device 100 can determine the weights to optimize color balance or any other picture quality measurements. The weights can be selected based on balancing of a single color channel (e.g., gray balancing) or multiple color channels. Unlike a typical color balancing algorithm, the composition optimization algorithm does not adjust the captured images themselves, but rather adjusts the weights associated with the component images to optimize for the picture quality measures of a composite image 124 comprised of the components images. For example, picture quality measures can include image noise level, color-specific intensity distribution characteristics (e.g., variance, mean, mode, median, etc.), dynamic range, sharpness, tone reproduction, contrast, color accuracy, aberrations (e.g., chromatic aberration, lens flare, other optical artifacts) quantity, exposure accuracy, vignetting amount, color moiré quantity, or any combination thereof). For example, thresholds on the picture quality measures can serve as criteria for satisfying the goals of the composition optimization algorithm.

In some embodiments, the mobile device 100 or the remote computer server 120 can generate previews of several potential composite images based on different weights for an operating user of the mobile device 100 to select. Once the operating user selects a potential composite image, the mobile device 100 can finalize the weights of the component images based on the selection. In some embodiments, the weights of the component images can be fractional values (e.g., inclusively between 0 and 1). In some embodiments, the weights of the component images can add up to 1. In some embodiments, the weights of the component images can add up to exceed 1 or to be below 1.

Figure 2:
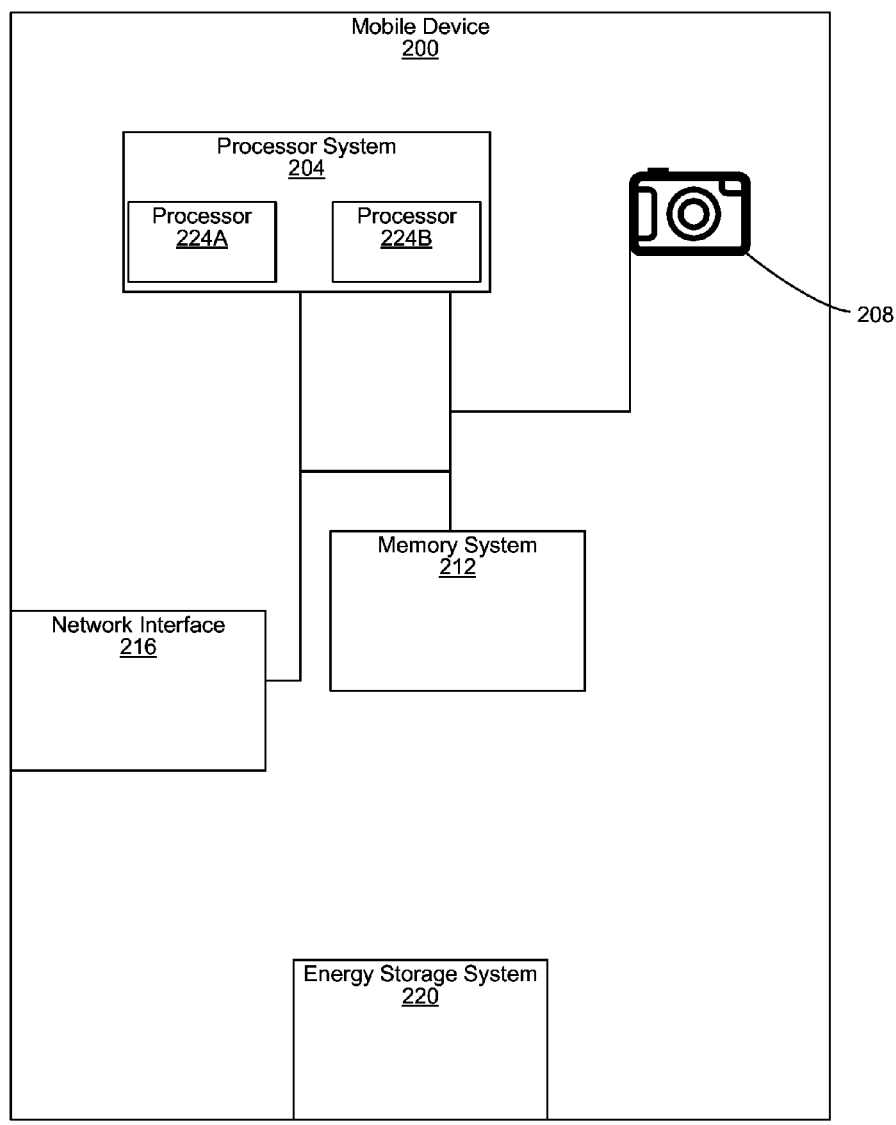
FIG. 2 is a block diagram of a mobile device, in accordance with various embodiments.

FIG. 2 is a block diagram of a mobile device 200, in accordance with various embodiments. The mobile device 200 can include a processor system 204, a camera 208, a memory system 212, a network interface 216, an energy storage system 220, or any combination thereof. The processor system 204 can include one or more processors (e.g., a processor 224A and a processor 224B, collectively as the "processors 224"). In some embodiments, the processors 224 are processor cores in a single central processing unit (CPU). In some embodiments, the processors 224 are independent processors.

The memory system 212 can include volatile memory, persistent/nonvolatile memory, random access memory, solid state memory, or any combination thereof. The memory system 212 is capable of storing digital data for the processor system 204. For example, the memory system 212 can store images and photographs taken by the camera 208. For another example, the memory system 212 can store executable instructions that can configure the processor system 204 to implement various functional components (e.g., functional components of FIG. 4). In some embodiments, the memory system 212 includes a storage adapter. The storage adapter enables the mobile device 200 to access a portable data storage (e.g., an external memory card) that can be coupled to the memory system 212.

The network interface 216 provides the mobile device 200 with the ability to communicate with remote devices, over a wired and/or a wireless network. The network interface 216 can include a network adapter, such as an Ethernet adapter or Fibre Channel adapter. The network interface 216 may also provide the mobile device 200 with the ability to communicate with other computers (e.g., the remote computer server 120 of FIG. 1).

The camera 208 is a component device for recording visual images in the form(s) of photograph, film, and/or video. Optical instruments of the camera can record the images in a digital format to be stored in the memory system 212 or to be transmitted to an external device (e.g., the remote computer server 120) via the network interface 216.

The energy storage system 220 can power the processor system 204, the memory system 212, the network interface 216, the camera 208, or any combination thereof. For example, the energy storage system 220 can include a battery and/or a battery compartment. In some embodiments, the energy storage system 220 can be rechargeable.

Figure 3:
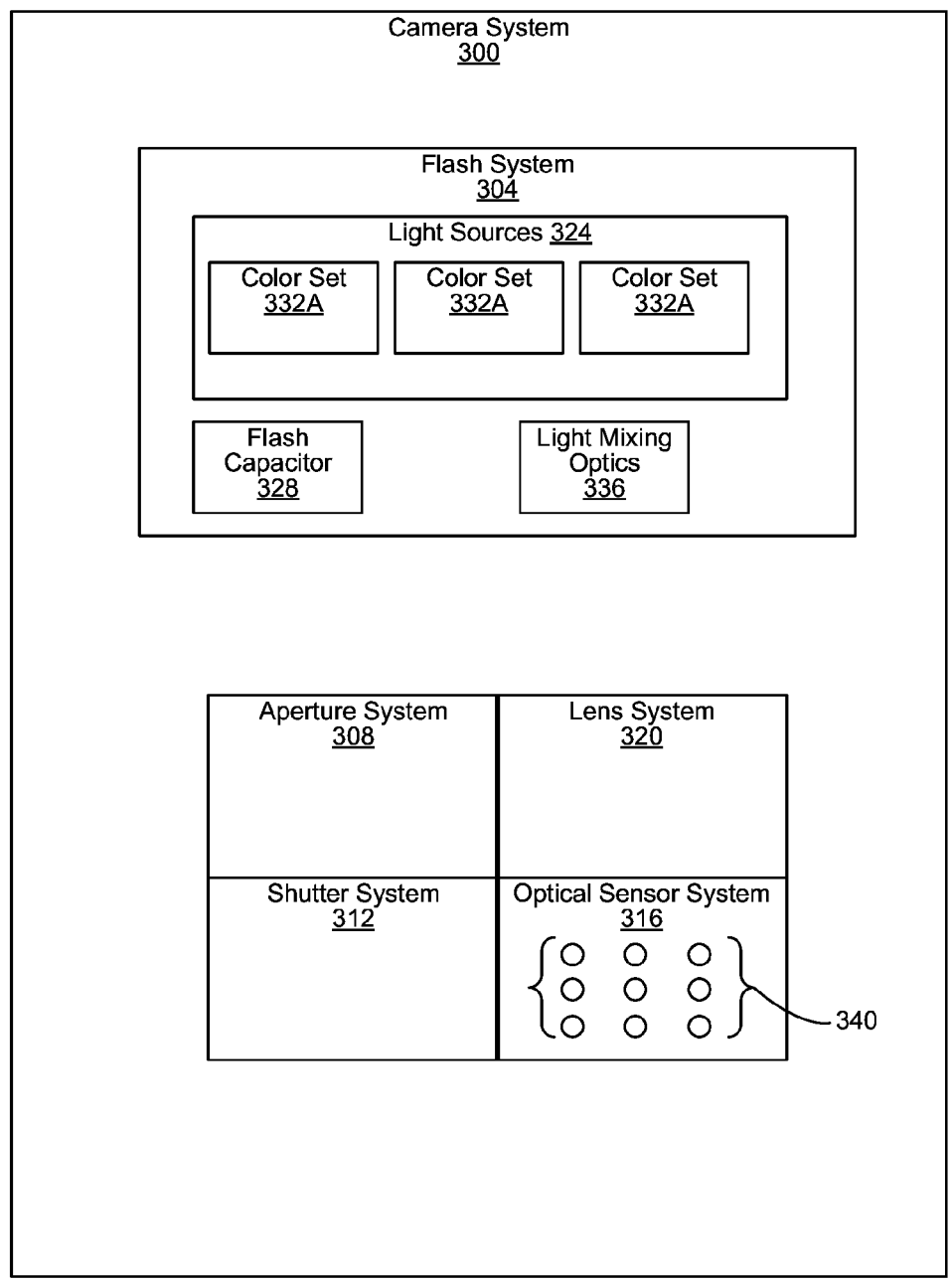
FIG. 3 is a block diagram of a camera system of a mobile device, in accordance with various embodiments.

FIG. 3 is a block diagram of a camera system 300 (e.g., the camera 208 of FIG. 2) of a mobile device, in accordance with various embodiments. The camera system 300 can include a flash system 304, an aperture system 308, a shutter system 312, an optical sensor system 316, a lens system 320, or any combination thereof. In some embodiments, the camera system 300 does not include the aperture system 308. In some embodiments, the camera system 300 does not include the shutter system 312. The flash system 304 can include one or more light sources 324 (e.g., light emitting component devices). For example, the light sources can be light emitting diodes and/or light bulbs. In some embodiments, the flash system 304 includes a flash capacitor 328. For example, the mobile device can charge the flash capacitor 328 with its power source (e.g., the energy storage system 220 of FIG. 2). The flash capacitor 328 enables the flash system 304 to provide a large amount of electrical current to the light sources 324 that the power source of the mobile device cannot otherwise provide.

In some embodiments, the light sources 324 can be divided into multiple color sets (e.g., a color set 332A, a color set 332B, and a color set 332C, collectively as the "color sets 332"). One or more light sources in each of the color sets 332 can produce substantially same color. In one example, the color set 332A can correspond to red, the color set 332B can correspond to green, and the color set 332C can correspond to blue. In another example, the color set 332A can correspond to white, the color set 332B can correspond to a warm hue (e.g., amber), and the color set 332C can correspond to a cool hue (e.g., blue). The flash system 304 can include circuitry to drive each of the color sets 332 with different electric current levels to produce different intensity from each of the color sets 332. In some embodiments, the flash system 304 includes circuitry to drive the color sets 332 and/or the light sources 324 individually. In some embodiments, the flash system 304 includes one or more light mixing optics 336 to make the light produced from the color sets 332 well blended (e.g., with its component light sources substantially invisible).

The aperture system 308 can control a lens diaphragm opening over the lens system 320. The size of the diaphragm opening can be regulated by the camera system 300 automatically or based on one or more commands from the mobile device. The size of the diaphragm opening can regulate the amount of light passes through onto the optical sensor system 316 inside the camera system 300.

The shutter system 312 controls how long the optical sensor system 316 is exposed to light. The optical sensor system 316 can capture a photograph by opening and closing a gate of the shutter system 312. The camera system 300 can capture consecutive images by repeatedly opening and closing the gate of the shutter system 312. For example, the shutter system 312 can use a pair of "curtains" or "blinds." One of the blinds can open to start the exposure, and the other blind is closed to end the exposure.

The optical sensor system 316 includes a matrix of optical sensors 340. Each of the optical sensors 340 is a sensor that detects and conveys information that constitutes at least a pixel of an image. For example, the optical sensors 340 can convert the variable attenuation of waves (e.g., as they pass through or reflected off of objects) into electrical signals. The converted electrical signals can be saved in a digital format according to the relative positions of the optical sensors 340. In some embodiments, the optical sensor system 316 includes optical filters (e.g., color filters). In some embodiments, sets of the optical sensors 340 are specialized to detect particular color types.

The lens system 320 includes one or more lens assemblies used in conjunction with the optical sensor system 316. For example, the lens system 320 can focus light from surrounding area onto the optical sensor system 316.

Figure 4:
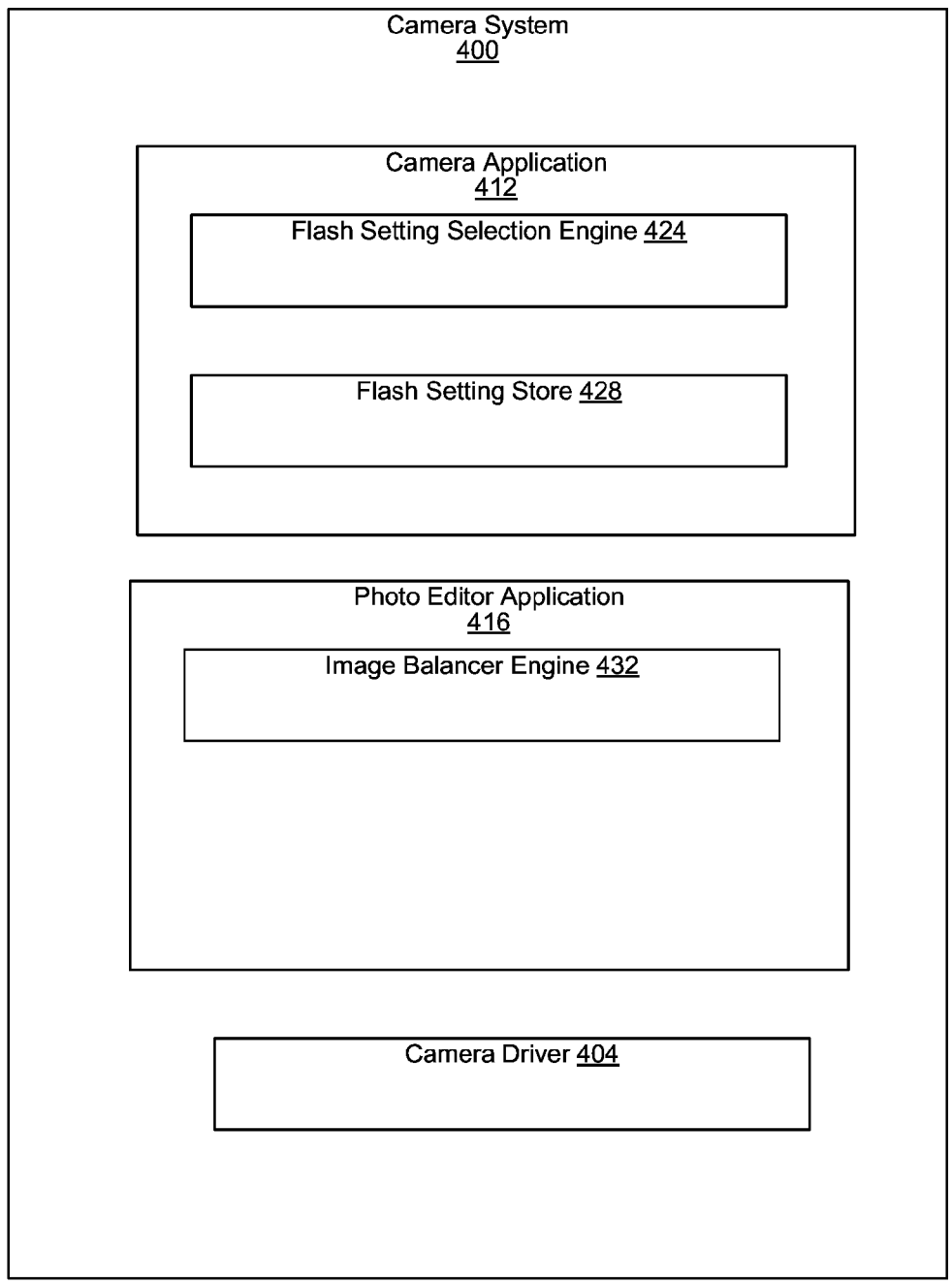
FIG. 4 is a block diagram of functional components of a camera system implemented on a mobile device, in accordance with various embodiments.

FIG. 4 is a block diagram of functional components of a camera system 400 implemented on a mobile device (e.g., the mobile device 100 of FIG. 1 and/or the mobile device 200 of FIG. 2), in accordance with various embodiments. The camera system 400 can be the camera system 300 of FIG. 3. The functional components can be executable instructions stored on the mobile device. A processor (e.g., the processor system 204 of FIG. 2) can execute the executable instructions to implement the functional components.

The camera system 400 can include a camera driver 404, a camera application 412, a photo editor application 416, or any combination thereof. The camera driver 404 can expose the functionalities of a camera system (e.g., the camera system 300 of FIG. 3) to one or more applications running on the mobile device (e.g., an operating system of the mobile device). For example, the camera driver 404 can enable the camera application 412 to control a flash subsystem (e.g., the flash system 304), an aperture subsystem (e.g., the aperture system 308), and/or a shutter subsystem (e.g., the shutter system 312) of the camera system. The camera driver 404 can also provide a digital image captured by an optical sensor subsystem (e.g., the optical sensor system 316) of the camera system.

The camera application 412 provides photography functionalities for the mobile device. For example, the camera application 412 can provide a user interface. The user interface can display a live video feed received from the camera driver 404 such that the user can preview a picture to take with the camera system 400. The user interface can be coupled to a button (e.g., a touchscreen button and/or a physical button) of the mobile device. A click of the button can trigger a command to photograph. Responsive to the command to photograph, the camera application 412 can instruct the camera driver 404 to take consecutive images, unlike traditional cameras that only take a single image.

The camera application 412 can also include a flash setting selection engine 424 and a flash setting store 428. The flash setting selection engine 424 identifies a plurality of different flash settings in response to a command to photograph. The plurality of different flash settings can be computed/determined dynamically or can be identified by retrieving the flash settings from a configuration setting stored in the flash setting store 428. The flash setting storage 428 can be a configuration file in the memory of the mobile device. The flash setting selection engine 424 can instruct the flash subsystem via the camera driver 404 to execute a sequence of flashes according to the plurality of different flash settings. The camera application 412 can instruct the camera driver 404 to cause the camera to take the consecutive images synchronized to the sequence of flashes.

The photo editor application 416 can provide one or more photo editing functionalities on the mobile device. For example, the photo editor application 416 can provide a user interface to edit captured photographs. In some embodiments, an editable photograph is represented a single image stored on the mobile device. In some embodiments, an editable photograph is represented by a set of consecutively captured images.

In various embodiments, the photo editor application 416 can include an image balancer engine 432. The image balancer engine 432 can generate a composite image to represent an editable photograph by combining a set of consecutively captured images according to weight values corresponding to the consecutively captured images. The image balancer engine 432 can generate the composite image with or without user assistance.

In some embodiments with user assistance, the image balancer engine 432 can request the user to specify the weight values. In some other embodiments with user assistance, the image balancer engine 432 can request the user to select at least one of composite image previews generated from a plurality of weighted blends of the consecutively captured images. In some embodiments without user assistance, the image balancer engine 432 can determine the weight values corresponding to the consecutively captured images automatically. For example, the image balancer engine 432 can generate multiple composite images from the consecutively captured images and selecting weight values corresponding to the best one according to picture quality measures.

Physical and functional components (e.g., devices, engines, modules, and data repositories, etc.) associated with the mobile device 100, the mobile device 200, the camera system 300, and/or the camera system 400 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implements a portion of the functional components). Other arrays, systems and devices described above may include additional, fewer, or different functional components for various applications.

Figure 5:
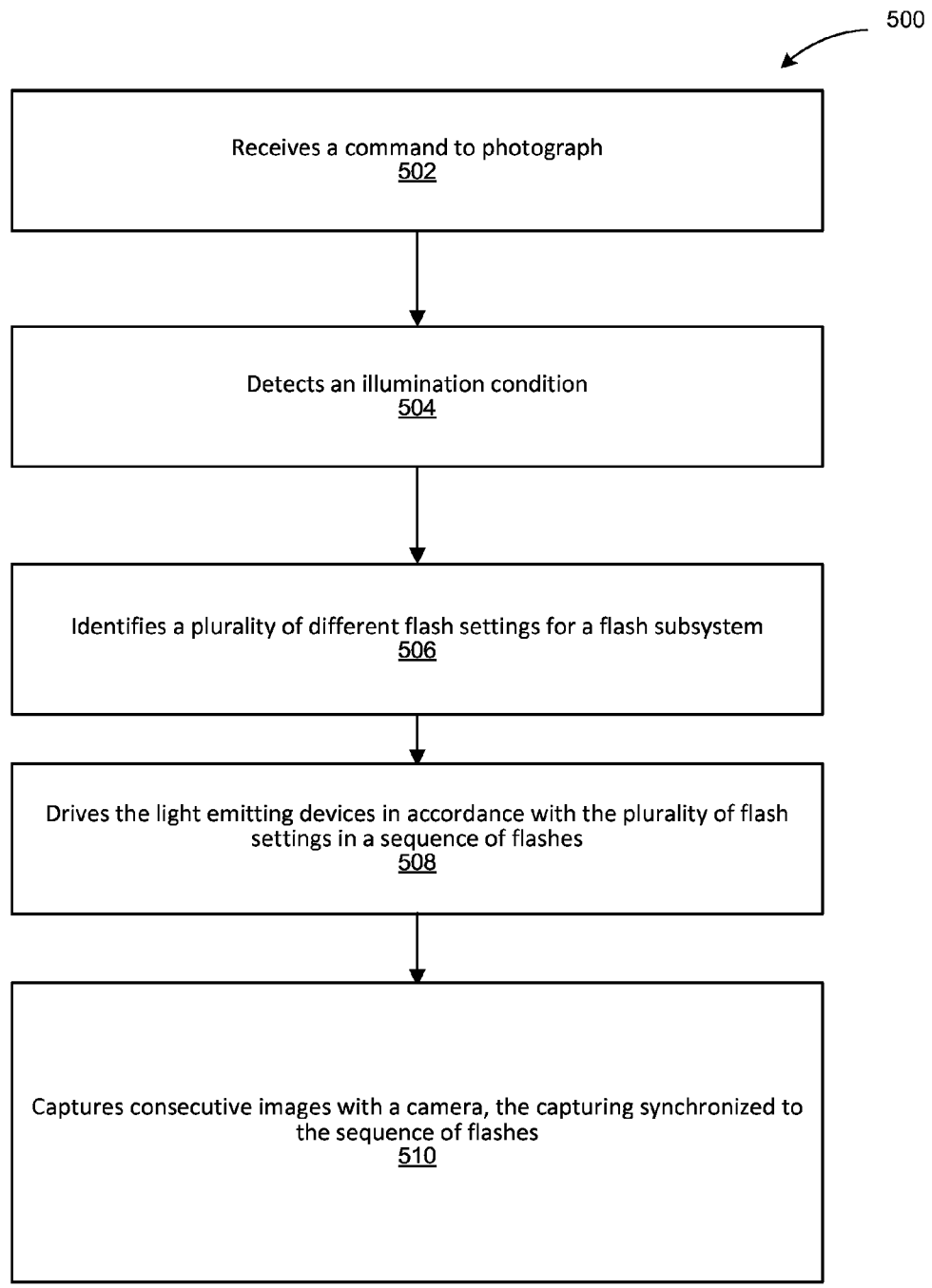
FIG. 5 is a flow chart of a method of operating a camera to capture consecutive images under different flash settings, in accordance with various embodiments.

FIG. 5 is a flow chart of a method 500 of operating a camera to capture consecutive images under different flash settings, in accordance with various embodiments. At step 502, a camera system (e.g., the camera system 300 of FIG. 3 and/or the camera system 400 of FIG. 4) of a mobile device (e.g., the mobile device 100 of FIG. 1 or the mobile device 200 of FIG. 2) receives a command to photograph.

In some embodiments, the method 500 includes step 504, where the camera system detects an illumination condition (e.g., in response to receiving the command to photograph). At step 506, responsive to the command to photograph, the camera system identifies a plurality of different flash settings for a flash subsystem (e.g., the flash system 304 of FIG. 3) of the camera system. For example, the flash settings can configure (e.g., identify how to drive) one or more light emitting devices of the flash subsystem. If step 504 is included in the method 500, the camera system can determine the plurality of flash settings based on the detected illumination condition. The illumination condition can be detected by a light sensor, independent of the camera, or by the camera. For example, if the illumination condition indicates a darker context, the plurality of flash settings can instruct the light emitting devices to emit more light, and if the illumination condition indicates a lighter context, the plurality of flash settings can instruct the light emitting devices to emit less light.

In some embodiments, the flash subsystem has only a single light emitting device. The plurality of flash settings can correspond to driving currents and/or illumination intensities of the single light emitting device. In some embodiments, the flash subsystem includes multiple colored lights emitting different colors. Each of the multiple colored lights can include one or more light emitting devices of substantially same color. The plurality of flash settings can specify driving currents and/or illumination intensities of the light emitting devices of the multiple color lights. For example, the multiple colored lights include any combination of a yellow light, an amber light, a blue light, and a white light.

In some embodiments, the camera system can also identify a plurality of camera configurations corresponding to the plurality of flash settings. For example, the plurality of camera configurations can include a plurality of exposure rates, a plurality of aperture sizes, a plurality of shutter speeds, or any combination thereof.

At step 508, the flash subsystem drives the light emitting devices in accordance with the plurality of flash settings in a sequence of flashes (e.g., responsive to the command to photograph). In some embodiments, the light emitting devices include one or more color specific sets. Each of the color specific sets includes one or more light emitting devices of substantially same emission spectrum.

At step 510, the camera system captures consecutive images (e.g., responsive to the command to photograph). The camera system can synchronize the capturing of the consecutive images with the sequence of flashes produced by the flash subsystem. In some embodiments, the consecutive images and the sequence of flashes are synchronized to have a one-to-one mapping. In some embodiments, at least one flash of the sequence of flashes maps to more than one of the consecutive images. In various embodiments, a flash can occur within fraction of a second (e.g., less than $\frac{1}{10}$ of a second) from a previous flash such that the surfaces illuminated the flashes remain substantially in the same positions in the consecutive images, even if the surfaces are moving relative to the camera system or vice versa.

In embodiments where the camera system identifies the plurality of camera configurations, the camera system can capture the consecutive images respectively in accordance with the plurality of camera configurations. These embodiments enable the camera system to capture the consecutive images that respectively correspond to both the flash settings and the camera configurations.

Figure 6:
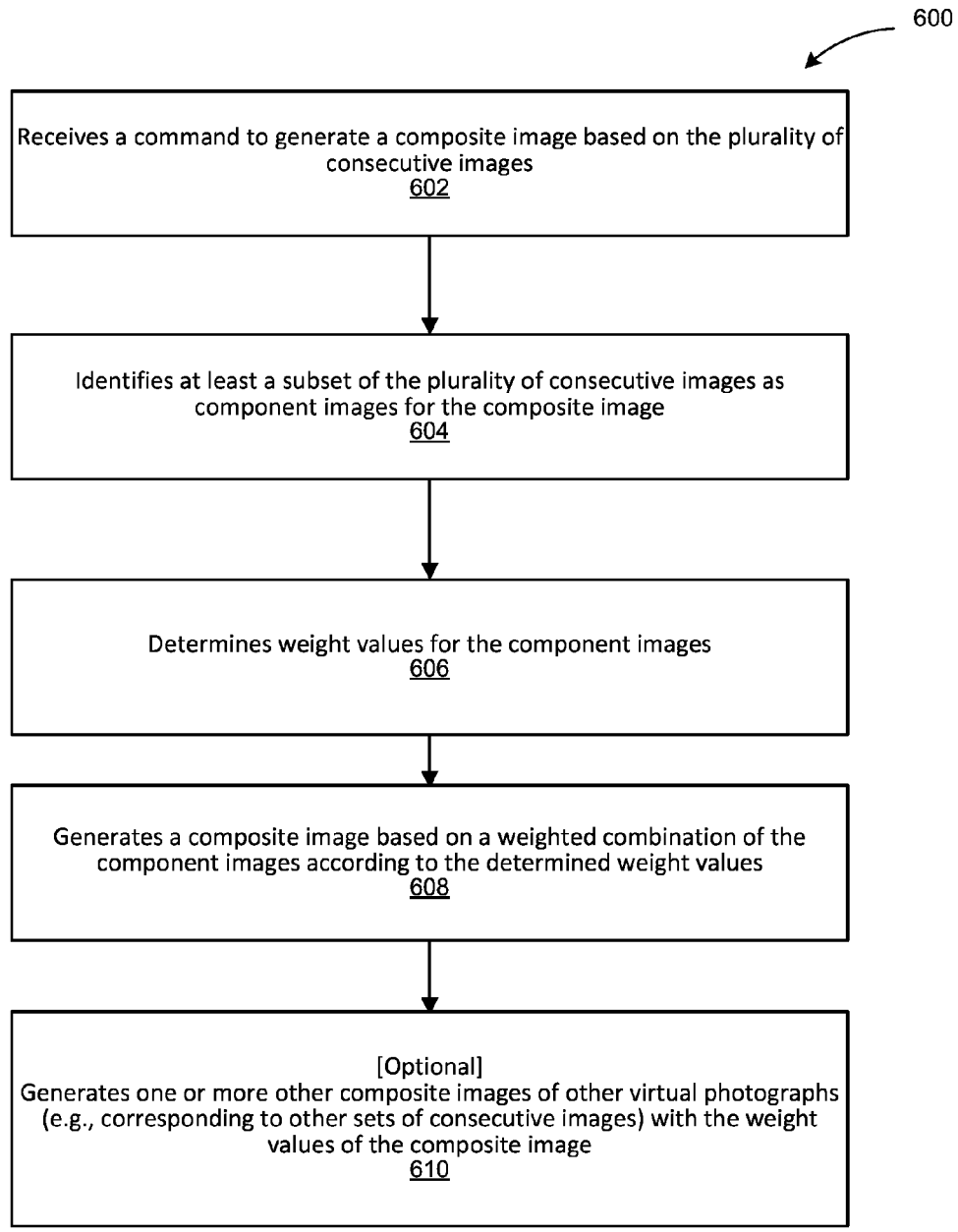
FIG. 6 is a flow chart of a method of operating a computing device to generate a composite image from a plurality of consecutive images captured under different flash settings, in accordance with various embodiments.

FIG. 6 is a flow chart of a method 600 of operating a computing device to generate a composite image from a plurality of consecutive images captured under different flash settings, in accordance with various embodiments. In some embodiments, the computing device is the mobile device configured to execute the method 500 of FIG. 5. In some embodiments, the computing device is a remote computer server (e.g., the remote computer server 120 of FIG. 1) that receives the plurality of consecutive images from the mobile device. In some embodiments, the method 600 is executed by the computing device in response to the completion of the method 500.

At step 602, the computing device receives a command to generate the composite image based on the plurality of consecutive images. The plurality of consecutive images can be associated with a single command to photograph received by a camera system (e.g., the camera system 300 of FIG. 3). For example, the command can be received on a user interface of the camera application 412 of FIG. 4. In some embodiments, the command can be issued in response to completion of the method 500. In some embodiments, the command can be triggered by a user interacting with a photo editing application (e.g., the photo editor application 416 of FIG. 4). In some embodiments, the command can be triggered by a user opening a virtual photograph represented by the plurality of consecutive images. The virtual photograph can be a placeholder for the composite image before the composite image is generated.

At step 604, the computing device identifies at least a subset of the plurality of consecutive images as component images for the composite image. In some embodiments, the component images include all of the consecutive images. For example, the computing device can filter out images that with bad picture quality (e.g., below a picture quality threshold) according to picture quality measures of the consecutive images. The images that are not filtered out can be selected as the component images.

At step 606, the computing device determines weight values for the component images. In some embodiments, the computing device computes the weight values based on user interactions with the photo editor application 416. In some embodiments, the computing device computes the weight values automatically. For example, the computing device can compute the weight values automatically using a composition optimization algorithm that adjusts the weight values to maximize one or more picture quality measures. In another example, the computing device can compute the weight values with the facilitation of a user interface. For example, the computing device can generate the user interface to adjust the composite image by tuning weight values respectively associated with the at least a subset of the consecutive images.

At step 608, the computing device generates a composite image based on a weighted combination of the component images according to the determined weight values of step 606. In some embodiments, the computing device generates multiple composite images. The plurality of composite images respectively correspond to a plurality of weighted blends of the consecutive images, where each weighted blend has a different set of weight values. In one example, these composite images are based on the same component images. In another example, these composite images are based on different component images selected from the consecutive images.

In some embodiments, at step 610, the computing device automatically generates one or more other composite images of other virtual photographs (e.g., corresponding to other sets of consecutive images) with the weight values of the composite image (e.g., generated at step 608). The computing device can determine whether context data associated with the other composite images matches context data associated with the composite image generated at step 608. For example, the computing device can determine whether the location or timestamp data of the other composite images matches the location or timestamp data of the composite image. When the context data matches, the weight values can be replicated to save computation resources and to avoid having to reoptimize (e.g., using the composition optimization algorithm).

While processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Some embodiments of the disclosure have other aspects, elements, features, and steps in addition to or in place of what is described above. These potential additions and replacements are described throughout the rest of the specification. Reference in this specification to "various embodiments" or "some embodiments" means that a particular feature, structure, or characteristic described in connection with the embodiment is included in at least one embodiment of the disclosure. Alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments.

What is claimed is:

1. A method of operating a mobile device, the method comprising:
   receiving a command to take a photograph with a camera associated with the mobile device;
   selecting a plurality of different flash settings for one or more light emitting devices associated with the mobile device, wherein the one or more light emitting devices comprise one or more color specific sets, wherein each of the one or more color specific sets comprises one or more light emitting devices of substantially same emission spectrum;
   driving the one or more light emitting devices in accordance with the plurality of flash settings in a sequence of flashes;
   capturing consecutive images with the camera in response to said command, wherein capture of each said image is synchronized with the driving of the one or more light emitting devices during the sequence of flashes to capture each said image with a different flash set; and
   generating a composite image based on at least a subset of the consecutive images.

2. A mobile device comprising:
   a data memory storing executable instructions;
   a camera;
   a flash system for the camera, wherein the flash system comprises one or more light emitting devices;
   a processor system configured by the executable instructions to control the flash system and the camera; and
   wherein the processor system is further configured to:

receive a command to take a photograph with the camera;

in response to the received command, select a plurality of flash settings for the flash system;

drive the flash system in a sequence of flashes respectively corresponding to the plurality of flash settings; and capture consecutive images utilizing the camera, wherein said capturing is synchronized to said driving the flash system to capture each of the consecutive images with a different flash set;

generate a composite image by identifying at least a subset of the consecutive images as component images of the composite image and combining, according to weight values, the component images to produce the composite image.

3. The mobile device of claim 2, wherein the processor system is configured to generate a user interface to adjust the composite image by tuning the weight values respectively associated with the component images.

4. The mobile device of claim 3, wherein the processor system is configured to automatically adjust one or more other composite images with user-selected weight values by matching context data associated with the other composite images and context data associated with the composite image.

5. The mobile device of claim 4, wherein the processor system is configured to match location or timestamp data of the other composite images against location or timestamp data of the composite image.

6. A mobile device comprising:

a data memory storing executable instructions;

a camera;

a flash system for the camera, wherein the flash system comprises one or more light emitting devices, and further wherein the flash system comprises multiple colored lights corresponding to different colors, wherein each of the multiple colored lights comprises one or more light emitting devices of substantially same color;

a processor system configured by the executable instructions to control the flash system and the camera; and wherein the processor system is further configured to:

receive a command to take a photograph with the camera;

in response to the received command, select a plurality of flash settings for the flash system;

drive the flash system in a sequence of flashes respectively corresponding to the plurality of flash settings; and capture consecutive images utilizing the camera, wherein said capturing is synchronized to said driving the flash system to capture each of the consecutive images with a different flash set.

* * * * *